United States Patent
Lien et al.

(10) Patent No.: US 7,362,480 B2
(45) Date of Patent: Apr. 22, 2008

(54) METHOD AND SYSTEM FOR CHANGING A SCANNING RESOLUTION

(75) Inventors: Chin-Chung Lien, Taipei Hsien (TW); Tsung-Yin Chen, Hsinchu (TW)

(73) Assignee: Transpacific IP, Ltd., Taipei (TW)

( * ) Notice: Subject to any disclaimer, the term of this patent is extended or adjusted under 35 U.S.C. 154(b) by 1069 days.

(21) Appl. No.: 10/063,446

(22) Filed: Apr. 24, 2002

(65) Prior Publication Data
US 2003/0202219 A1    Oct. 30, 2003

(51) Int. Cl.
*H04N 1/04* (2006.01)
(52) U.S. Cl. ............ 358/497; 358/471; 358/474; 358/475; 358/493; 358/494; 399/200; 399/201; 399/202
(58) Field of Classification Search .......... 358/480, 358/444, 488, 426.02, 293, 473–475, 450, 358/471, 493, 494, 497; 382/293, 313, 284; 356/216; 359/205, 216; 250/236; 345/115; 347/225, 230, 241, 242, 245; 399/200, 201
See application file for complete search history.

(56) References Cited

U.S. PATENT DOCUMENTS

| | | | | |
|---|---|---|---|---|
| 3,782,835 A | * | 1/1974 | Abel | 356/216 |
| 4,006,299 A | * | 2/1977 | Grafton | 358/480 |
| 5,410,417 A | * | 4/1995 | Kuznicki et al. | 358/426.02 |
| 5,452,374 A | * | 9/1995 | Cullen et al. | 382/293 |
| 6,005,681 A | * | 12/1999 | Pollard | 358/473 |
| 6,097,507 A | * | 8/2000 | Bohn | 358/473 |
| 2002/0063772 A1 | * | 5/2002 | Sasaki | 347/239 |

FOREIGN PATENT DOCUMENTS

JP          05176125 A  *  7/1993

* cited by examiner

*Primary Examiner*—Twyler Haskins
*Assistant Examiner*—Vu Hang
(74) *Attorney, Agent, or Firm*—Stolowitz Ford Cowger LLP

(57) ABSTRACT

A method and system for scanning comprises rotating a scanning chassis of an optical scanner to create an acute angle between the scan line and a scanning direction, such that the scanning chassis has two ends, and moving the scanning chassis in the scanning direction and with the acute angle between the scan line and the scanning direction, both two ends of the scanning chassis being moved in the scanning direction, while one of the two ends is moved more slowly than the other one so that the scanning chassis is made to be rotated with the acute angle.

27 Claims, 4 Drawing Sheets

METHOD AND SYSTEM FOR CHANGING A SCANNING RESOLUTION

BACKGROUND OF INVENTION

1. Field of the Invention

The invention relates in general to a method and a structure for changing a scanning resolution. The method and the structure can be adapted for an optical scanner. Using the method and the structure, excepting a normal scanning mode, the other scanning mode of a high resolution can be chosen to operate the optical scanner.

2. Description of Related Art

With improvement of computer performance and high development of multimedia technology, analog-based images of words or patterns can be captured using an optical scanner, then transformed into digital signals. As a result, after the process of transforming the analog-based images into the digital signals, an image file can be showed, identified, edited, saved or output by a computer or other instruments.

According to the ways to input document image, an optical scanner can be categorized into a packet scanner, a sheet-feed scanner, a drum scanner, a flatbed scanner and so on. The flatbed scanner is most popular among them because it can provide a scanning image with a stable quality, it can provide a function of scanning a reflection document or a transparent document, and, further, it is provided with an automatic document feeder (ADF) to scan a stack of documents with a same size.

In general, the flatbed scanner is provided with a piece of transparent glass on which a to-be scanned document, such as a negative plate, a projection document a reflection document, is placed. A scanning chassis positioned in the flatbed scanner is linearly driven using a chassis-positioned mechanism and a chassis-driven mechanism. Analog-based image signals on a surface of a document can be scanned step by step using the scanning chassis. Finally, digital image signals can be transfonned from the analog-based image signals and output.

Referring to FIG. 1A, FIG. 1A is a schematic view showing a motion of a conventional scanning chassis. A scanning chassis 10 scanning based on a scanning line 12 can move in a scanning direction 14 and can scan a document on the scanning chassis 110 step by step. The scan line 12 is perpendicular to the scanning direction 14.

Referring to both FIG. 1A and FIG. 1B, FIG. 1B is a schematic view showing an area scanned by a scanning chassis scanning based on a scan line, the width of which is "A", with a scanning chassis moving a distance "B" in a scanning direction according to a motion of a conventional scanning chassis shown in FIG. 1A. The number ($P_{N1}$) of total pixels in the scanning area divided by the total scanning area ($A_{D1}$) equals the number ($P_{UN1}$) of pixels in a unit scanning area, i.e. $P_{N1}/A_{D1} = P_{UN1}$, where $A_{D1} = A*B$. In the prior art, the scanning chassis 10 scans in a normal mode where a right angle exists between the scan line 12 and the scanning direction 14. In the above-mentioned normal mode, in order to enhance the resolution that the scanning chassis 10 scans a document, the number ($P_{UN1}$) of pixels in a unit scanning area should be increased. For example, to achieve the objective, an image sensor with a high resolution can be used. However, the cost of the image sensor with a high resolution is high.

SUMMARY OF INVENTION

Accordingly, an objective of the present invention is to provide a method and a structure for changing a scanning resolution. The method and the structure can be adapted for an optical scanner. Using the method and the structure, a scanning resolution of a scanner can be enhanced without changing an optical path inside the scanning chassis, a lens, an image sensor, or a stepping scanning velocity. In addition, excepting a normal scanning mode, the other scanning mode of a high resolution can be chosen to operate.

To achieve the foregoing and other objectives, the present invention provides a method for changing a scanning resolution. The method is suited for an optical scanner having a scanning chassis. The scanning chassis scans based on a scan line and moves in a scanning direction. The method comprises two steps, wherein Step 1 is to rotating the scanning chassis to create an acute angle between the scan line and the scanning direction, and Step 2 is moving the scanning chassis in the scanning direction and with the acute angle between the scan line and the scanning direction.

Besides, to achieve the foregoing and other objectives, the present invention further provides a structure of changing a scanning resolution. The structure is suited for an optical scanner. The optical scanner having a scanning chassis. The scanning chassis scans based on a scan line and moves in a scanning direction. The scanning chassis has a first end and a corresponding second end. The structure of changing a scanning resolution comprise a driving module and a leading module. The driving module is mounted in the optical scanner. The first end of the scanning chassis is pivotally mounted on the driving module and driven by the driving module in the scanning direction. The leading module is mounted in the optical scanner, the second end of the scanning chassis pivotally mounted on the leading module. The second end of the scanning chassis is guided by the leading module in the scanning direction. The scanning chassis is rotated to create an acute angle between the scan line and the scanning direction.

Both the foregoing general description and the following detailed description are exemplary and explanatory only and are not restrictive of the invention, as claimed. It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. A simple description of the drawings is as follows.

Both

Both

DETAILED DESCRIPTION

Figure 2A:
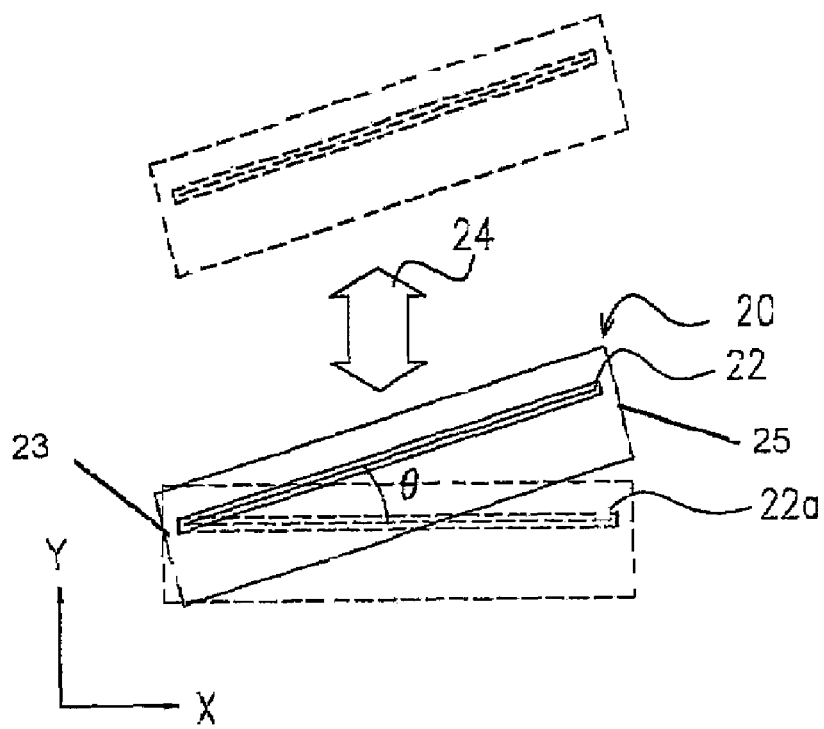
FIG. 2A is a schematic view showing a motion of a scanning chassis with a changeable scanning resolution according to the present invention.

Referring to FIG. 2A, FIG. 2A is a schematic view showing a motion of a scanning chassis with a changeable scanning resolution according to the present invention. A scanning chassis 20 can scan with a high resolution based on a scan line 22. The scanning chassis 20 is rotated with an acute angle θ between the scan line 22, based on which the scanning chassis 20 scans in a oblique mode, and the scan line 22a, based on which the scanning chassis 20 scans in a normal mode. In other words, 90 degrees minus an acute angle θ exists between the scan line 22 and a scanning direction 24 where the scanning chassis 20 moves. There are three ways to rotate the scanning chassis 20. The first way is that one end 23 of the scanning chassis 20 is fixed, the other end 25 of the scanning chassis 20 is moved until the scanning chassis 20 is made to be clockwise or counterclockwise rotated with an angle θ between the scan lines 22, 22a, and the scanning chassis 20 is moved in the scanning direction 24. The second way is that one end 23 of the scanning chassis 20 is moved in one direction, the other end 25 of the scanning chassis 20 is also moved in the other direction opposite to the direction where the end 23 of the scanning chassis 20 is moved until the scanning chassis 20 is made to be clockwise or counterclockwise rotated with an angle θ between the scan lines 22, 22a, and then the scanning chassis 20 is moved in the scanning direction 24. The third way is that the two ends 23, 25 of the scanning chassis 20 are moved in a same direction with the scanning chassis 20 being moved in the scanning direction 24, while one of the two ends 23, 25 is moved more slowly than the other one so that the scanning chassis 20 can be made to be clockwise or counterclockwise rotated with an angle θ between the scan lines 22, 22a.

Referring to FIG. 2A, after the scanning chassis 20 is rotated with an angle θ between the scan lines 22, 22a in one of the above-mentioned three ways, a document (not shown) can be scanned step by step with the scanning chassis 20 being moved in the scanning direction 24.

Figure 1A:
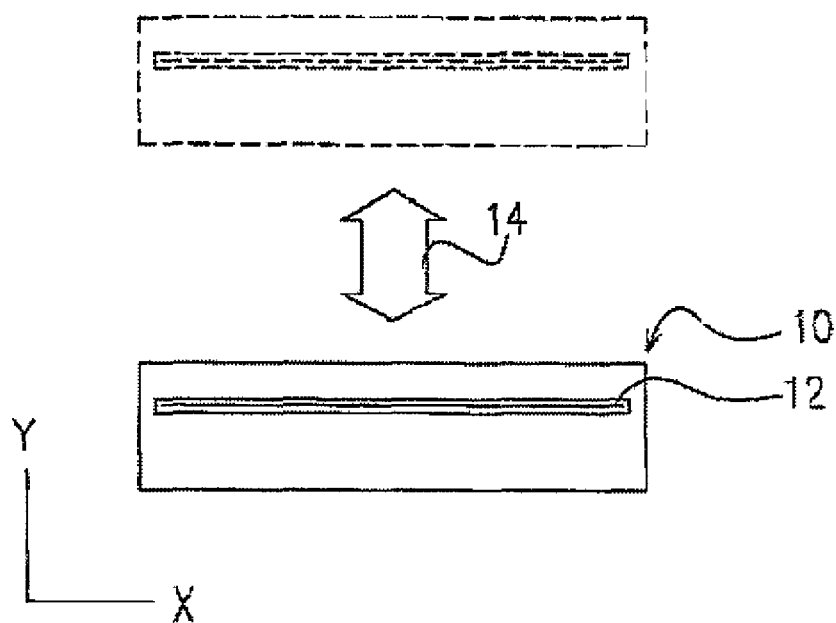
FIG. 1A is a schematic view showing a motion of a conventional scanning chassis.
Figure 1B:
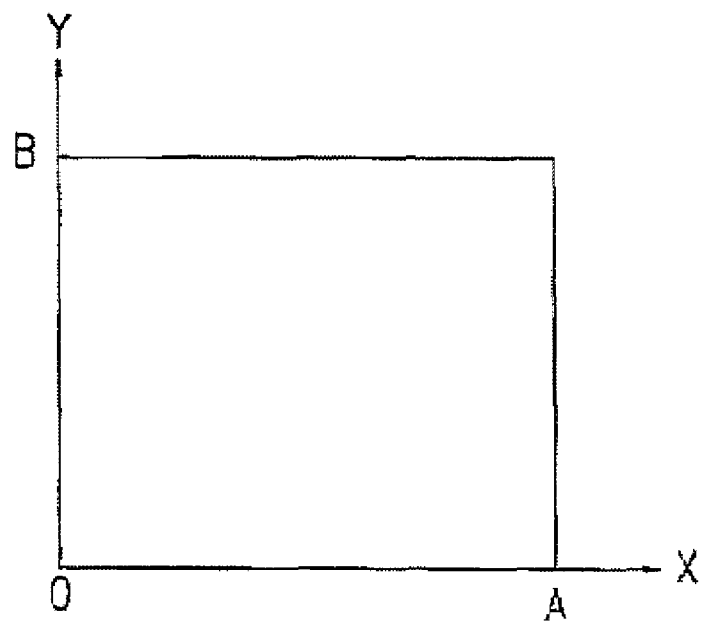
FIG. 1B is a schematic view showing an area scanned by a scanning chassis scanning based on a scan line, the width of which is "A", with a scanning chassis moving a distance "B" in a scanning direction according to a motion of a conventional scanning chassis shown in FIG. 1A.
Figure 2B:
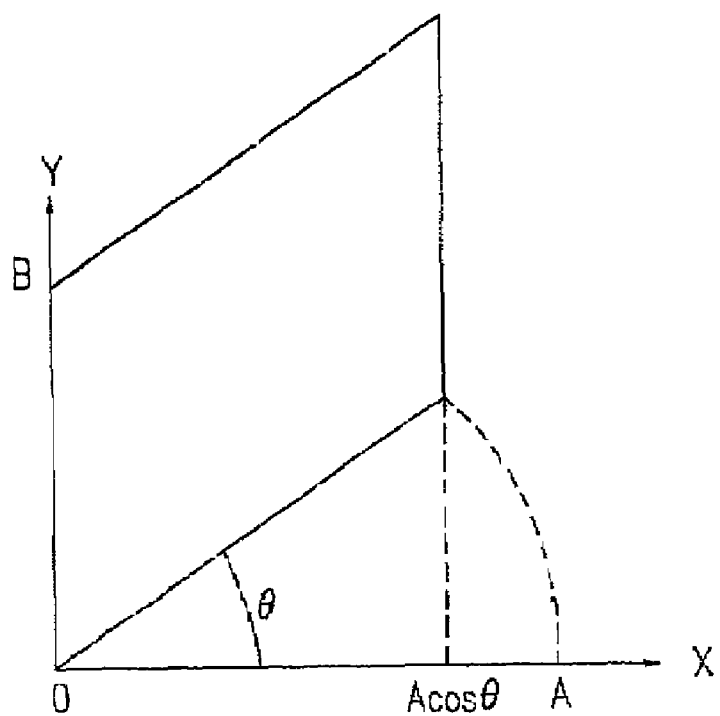
FIG. 2B is a schematic view showing an area scanned by a scanning chassis scanning based on a scan line, the width of which is "A", with a scanning chassis moving a distance "B" in a scanning direction according to a motion of a scanning chassis, shown in FIG. 2A, of the present invention.

Referring to both FIG. 2A and FIG. 2B and comparing with FIG. 1A and FIG. 1B respectively, FIG. 2B is a schematic view showing an area scanned by a scanning chassis scanning based on a scan line, the width of which is "A", with a scanning chassis moving a distance "B" in a scanning direction according to a motion of a scanning chassis, shown in FIG. 2A, of the present invention. The scanning chassis 20 can be scanned in an oblique mode, where the scanning chassis 20 is moved with an acute angle θ between the scan line 22 and the scanning direction 24, or in a normal mode where the scanning chassis 20 is moved with a right angle between the scan line 22a and the scanning direction 24.

Referring to FIG. 2B, the scanning chassis 20 can be scanned in an oblique mode. The number ($P_{N2}$) of the total pixels in the scanning area divided by the total scanning area ($A_{D2}$) equals the number ($P_{UN2}$) of pixels in a unit scanning area, i.e., $P_{N2}/A_{D2}=P_{UN2}$, where $A_{D2}=A*B*\cos\theta$. Comparing with the prior art, because $A_{D2}<A_{D1}$ and $P_{N1}=P_{N2}$, $P_{UN2}>P_{UN1}$. In other words, the number of ($P_{UN2}$) of pixels in a unit scanning area in an oblique mode is larger than the number ($P_{UN1}$) of pixels in a unit scanning area in a normal mode. Therefore, the resolution in an oblique mode can be larger than the resolution in a normal mode.

The above scanning method of the present invention can be adapted for an optical flatbed scanning. The scanning chassis is rotated with an acute angle between the scan line and the scanning direction and then the scanning chassis scans a document in the scanning direction. As a result, a scanning resolution can be set relatively high, but a document that can be scanned is reduced.

Figure 3A:
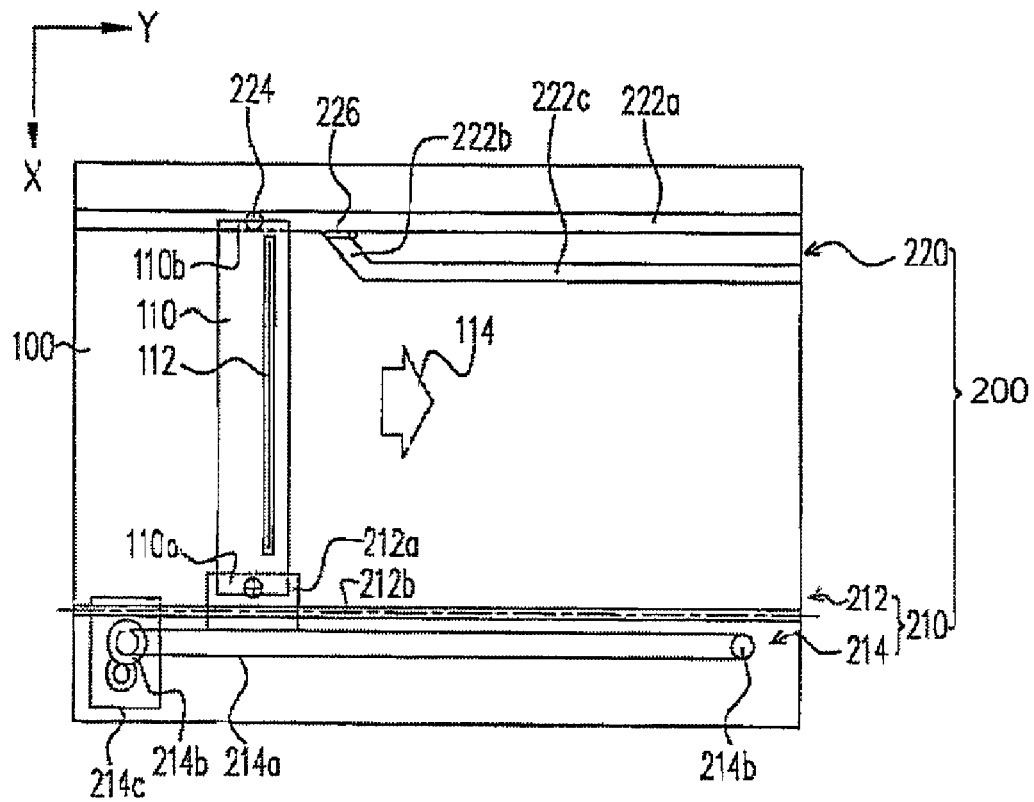
FIG. 3A and FIG. 3B are schematic views showing a motion of a scanning chassis with a changeable scanning resolution according to a first scanning mode of the present invention.
Figure 3B:
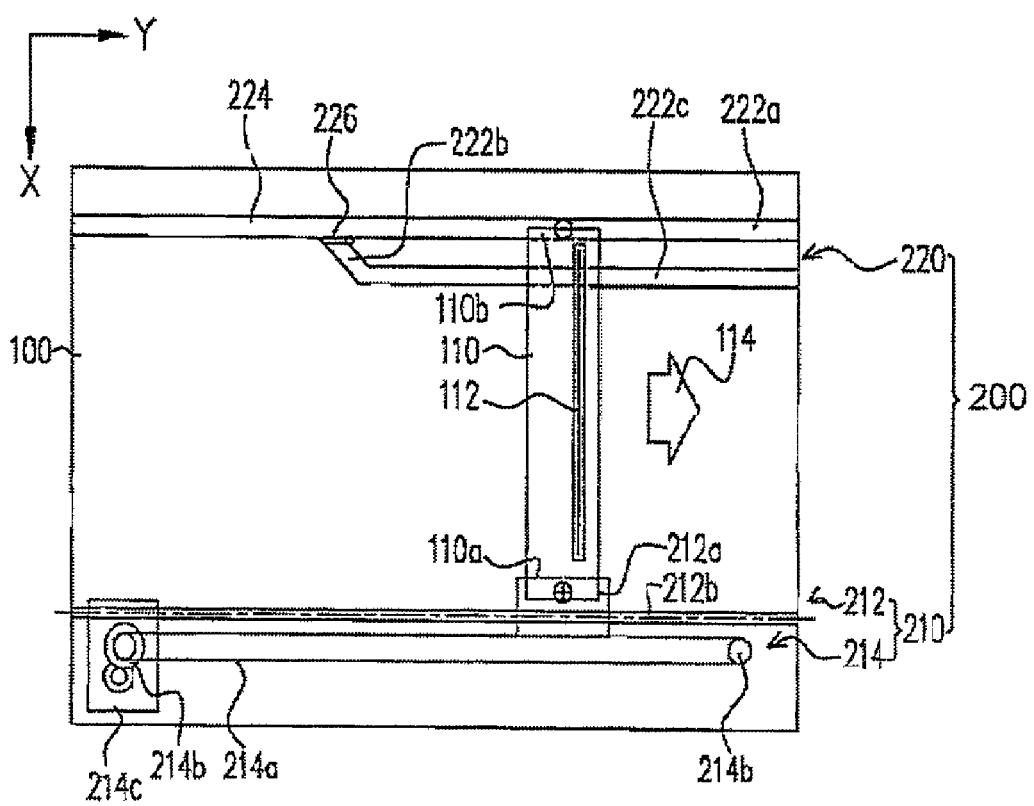

According to the above-mentioned method, the present invention provide a structure of changing a scanning resolution. Referring to FIG. 3A and FIG. 3B, both FIG. 3A and FIG. 3B are schematic views showing a motion of a scanning chassis with a changeable scanning resolution according to a first scanning mode of the present invention. A structure 200 of changing a scanning resolution is suited for an optical scanner 100, such as a flatbed optical scanner. The optical scanner 100 is provided with a scanning chassis 110, wherein the scanning chassis 110 has a first end 110a and a second end 110b. The scanning chassis 110 scanning based on a scanning line 112 can move in a scanning direction 114 and can scan a document on the scanning chassis 110 step by step. The scanning line 112 is perpendicular to the scanning direction 114.

Referring to FIG. 3A, the structure 200 of changing a scanning resolution includes a driving module 210 and a leading module 220. The driving module 210 is mounted in the optical scanner 100. A first end 110a of the scanning chassis 110 is pivotally mounted on the driving module 210 such that, by the driving module 210, the first end 110a of the scanning chassis 110 can be driven in the scanning direction 114. The driving module 210 is provided with a chassis-positioned mechanism 212 and a chassis-driven mechanism 214, wherein the chassis-positioned mechanism 212 has a bushing 212a and a shaft 212b. The first end 110a of the scanning chassis 110 is pivotally mounted on the bushing 212a and the shaft 212b is received by the bushing 212a. As a result, through the bushing 212a, the scanning chassis 110 can be linearly moved on the shaft 212b, wherein the shaft 212b extends in a direction parallel to the scanning direction 114.

Referring to FIG. 3A, the chassis-driven mechanism 214 includes a belt 214a, plenty of belt wheels 214b and a decelerating motor 214c, wherein the decelerating motor 214c is mainly constructed from a step motor (not shown) and a decelerating mechanism (not shown). The bushing 212a can be driven by the chassis-driven mechanism 214 and can be moved in a direction of extension of the shaft 212b. Therefore, the first end 110a of the scanning chassis 110 can be driven.

Referring to FIG. 3A, the leading module 220 is also mounted in the optical scanner 100. A second end 110b of the scanning chassis 110 is pivotally mounted on the leading module 220 such that, by the leading module 220, the second end 110b of the scanning chassis 110 can be guided in the scanning direction 114. As a result, when the first end 110a of the scanning chassis 110 is driven by the driving module 210, the second end 110b of the scanning chassis 110 is dragged by the driving module 210 in the scanning direction 114 with there existing a right angle or an acute angle between the scan line 112 and the scanning direction 114.

Referring to FIG. 3A, the leading module 220 includes a first track 222a extending in a direction parallel with the scanning direction 114, a second track 222c extending in a direction parallel with the scanning direction 114, and a connecting track 222b connecting the first track 222a with the second track 222c. The shortest distance between first track 222a and the first end 110a of the scanning chassis 110 is longer than the shortest distance between second track 222c and the first end 110a of the scanning chassis 110.

The leading module 220 further includes a sliding mechanism 224 that can rotatedly or non-rotatedly move on the first track 222a, the connecting track 222b, and the second track 222c. The second end 110b of the scanning chassis 110 is pivotally mounted on the sliding mechanism 224 such that it can be driven by the driving module 210. Further, the leading module 220 is provided with a switch 226 that is positioned between the first track 222a and the connecting track 222b. The path of movement of the sliding mechanism 224 can be changed by the switch 226.

Referring to both FIG. 3A and FIG. 3B, when the optical scanner 100 is in a first scanning mode, i.e. in a normal scanning mode, the switch 226 can be shifted to the location as shown in FIG. 3A. As a result, when the first end 110a of the scanning chassis 110 is driven by the driving module 210 in the scanning direction 114, the second end 110b of the scanning chassis 110 is dragged and, first, the sliding mechanism 224 is moved on the first track 222a. Because the switch 226 prevents the sliding mechanism 224 from moving to the connecting track 222b, the sliding mechanism 224 moves along the first track 222a again, as shown in FIG. 3B. At this moment, the scan line 112 is perpendicular to the scanning direction 114, and a largest scanning area can be provided in this first scanning mode.

Figure 4A:
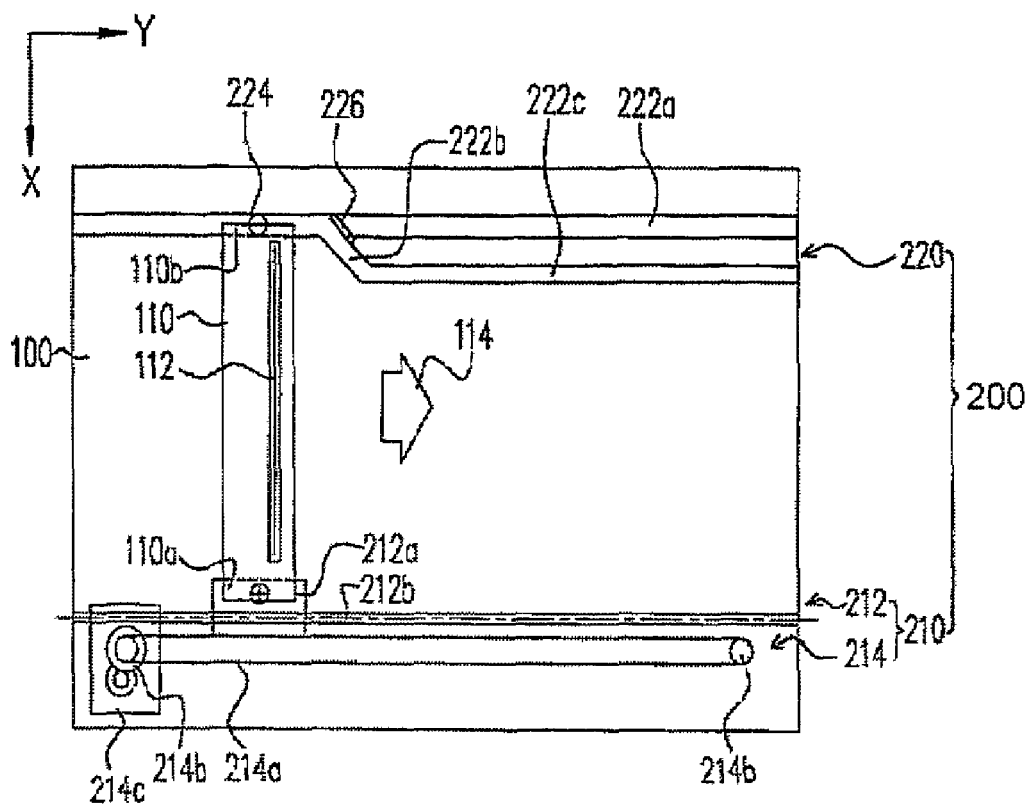
FIG. 4A and FIG. 4B are schematic views showing a motion of a scanning chassis with a changeable scanning resolution according to a second scanning mode of the present invention.
Figure 4B:
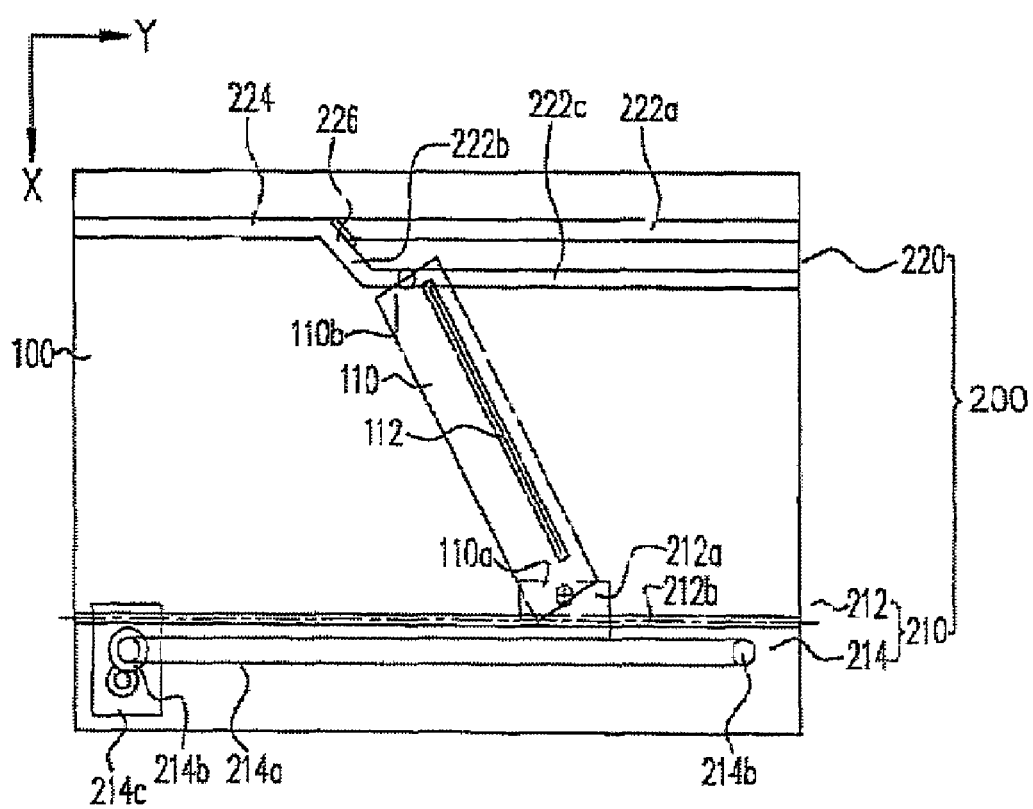

Referring to both FIG. 4A and FIG. 4B are schematic views showing a motion of a scanning chassis with a changeable scanning resolution according to a second scanning mode of the present invention. When the optical scanner 100 is in a second scanning mode, i.e. in a oblique scanning mode, the switch 226 can be shifted to the location as shown in FIG. 4A. As a result when the first end 110a is in a second scanning chassis 110 is driven by the driving module 210 in the scanning direction 114, the second end 110b of the scanning chassis 110 is dragged and, first, the sliding mechanism 224 is moved on the first track 222 a. Because the switch 226 prevents the sliding mechanism 224 fro moving along the first track 222a anymore, then the sliding mechanism 224 moves to the connecting track 222b and the second track 222c, as shown in FIG. 4B. At this moment, there is an acute angle between the scan line 112 and the scanning direction 114, and a high scanning resolution can be provided in this second scanning mode.

To sum up, the present invention has the following advantages:

1. According to the present invention, the scanning chassis can scan with an acute angle between the scan line and the scanning direction, whereby the number of pixels in a unit scanning area can be increased. Therefore, the scanning resolution can be enhanced.

2. According to the present invention, the leading module can be provided with many tracks and one end of the scanning chassis can move along one of the tracks of the leading module. The highest scanning resolution can be changed by switching the tracks. However, the higher scanning resolution is chosen by switching the track, the smaller scanning area is obtained. A user has to make tradeoffs between the scanning resolution and the scanning area.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A method for scanning the method comprising:
automatically rotating a scanning chassis of an optical scanner to create an acute angle between a scan line and a scanning direction, the scanning chassis having two ends: and,
automatically moving the scanning chassis in the scanning direction and with the acute angle between the scan line and the scanning direction, both two ends of the scanning chassis being automatically moved in the scanning direction, while one of the two ends is automatically moved more slowly than the other one so that the scanning chassis is made to be rotated with the acute angle.

2. A system comprising:
a driving module mounted in an optical scanner driven by a motor along a path in the optical scanner in a scanning direction, a first end of a scanning chassis pivotally mounted on the driving module, and the first end of the scanning chassis driven by the driving module in the scanning direction; and,
a leading module mounted in the optical scanner a second end of the scanning chassis pivotally mounted on the leading module, the second end of the scanning chassis guided by the leading module in the scanning direction, and the scanning chassis rotated within the optical scanner to create an acute angle between the scan line and the scanning direction.

3. A system comprising:
a driving module mounted in an optical scanner, a first end of a scanning chassis pivotally mounted on the driving module, and the first end of the scanning chassis driven by the driving module in a scanning direction; and,
a leading module mounted in the optical scanner, a second end of the scanning chassis pivotally mounted on the leading module, the second end of the scanning chassis guided by the leading module in the scanning direction, and the scanning chassis rotated to create an acute angle between the scan line and the scanning direction,
wherein the driving module is provided with a chassis-positioned mechanism, the chassis-positioned mechanism having a shaft and a bushing for receiving, the shaft, wherein the first end of the scanning chassis is pivotally mounted on the bushing.

4. The system according to claim 3, wherein the shaft extends in a direction parallel with the scanning direction.

5. The system according to claim 3, wherein the driving module further has a chassis-driven module for driving the bushing such that the first end of the scanning chassis can be moved in a direction of extension of the shaft.

6. A system comprising:
a driving module mounted in an optical scanner, a first end of a scanning chassis pivotally mounted on the driving module, and the first end of the scanning chassis driven by the driving module in a scanning direction; and,
a leading module monnted in the optical scanner, a second end of the scanning chassis pivotally mounted on the leading module, the second end of the scanning chassis guided by the leading module in the scanning direction, and the scanning chassis rotated to create an acute angle between the scan line and the scanning direction,
wherein the leading module comprises:
a first track extending in a direction parallel with the scanning direction;
at least one second track extending in a direction parallel with the scanning direction, wherein the shortest distance between the first track and the first end of the scanning chassis is longer than the shortest distance between the second track and the first end of the scanning chassis;
a connecting track connecting the first track and the second track;
a sliding mechanism adapted to move along the first track, the second track or the connecting track, the second end of the scanning chassis pivotally mounted on the sliding mechanism, whereby the second end of the scanning chassis can be moved along the first track, the second track or the connecting track; and
at least one switch adapted to shift the path of movement of the sliding mechanism.

7. A mechanism for guiding a path of movement of a scanning chassis having a first end and a corresponding second end, the mechanism comprising:
at least one first path, the first end of the scanning chassis moving along the first path;
at least two connected second paths the second end of the scanning chassis adapted to move along each of the second paths; and,
at least one switch mounted on the second paths, whereby the path of movement of the second end of the scanning chassis can be guided.

8. The mechanism according to claim 7, further comprises a chassis positioned mechanism, the chassis-positioned mechanism having a shaft and a bushing for receiving the shaft so that the bushing is able to move along the shaft, the first end of the scanning chassis is pivotally mounted on the bushing, and the path of movement of the bushing creates the first path.

9. The method according to claim 1, wherein rotating the scanning chassis comprises pivotally coupling one end of the scanning chassis to a driving module, and pivotally coupling the other end of the scanning chassis to a leading module, and
wherein moving the scanning chassis in the scanning direction comprises driving the one end of the scanning chassis by the driving module in the scanning direction, and guiding the other end of the scanning chassis by the leading module in the scanning direction.

10. The method according to claim 9, wherein the second end of the scanning chassis is coupled to a sliding mechanism, further comprising:
moving the sliding mechanism along of one of a first track and second track, the first and second track extending in a direction parallel with the scanning direction; and,
shifting a path of movement of the sliding mechanism between the first track and the second track.

11. A method comprising:
rotating a scanning chassis of an optical scanner to create an acute angle between a scan line and a scanning direction, the scanning chassis having two ends, wherein rotating the scanning chassis comprises pivotally coupling one end of the scanning chassis to a driving module, and pivotally coupling the other end of the scanning chassis to a leading module;
moving the scanning chassis in the scanning direction and with the acute angle between the scan line and the scanning direction, both two ends of the scanning chassis being moved in the scanning direction, while one of the two ends is moved more slowly than the other one so that the scanning chassis is made to be rotated with the acute angle, and wherein moving the scanning chassis in the scanning direction comprises driving the one end of the scanning chassis by the driving module in the scanning direction, and guiding the other end of the scanning chassis by the leading module in the scanning direction;
moving a sliding mechanism along one of a plurality of tracks, the second end of the scanning chassis being coupled to the sliding mechanism, each track extending in a direction parallel with the scanning direction, a distance between the one of the plurality of tracks and the first end of the scanning chassis being different than a distance between another of the plurality of tracks and the first end of the scanning chassis, each track of the plurality of tracks being coupled by a connecting track; and
shifting a path of movement of the sliding mechanism between one track of the plurality of tracks and another track of the plurality of tracks.

12. The method according to claim 11, further comprising:
moving a sliding mechanism along one of a plurality of tracks, the one end of the scanning chassis being coupled to the sliding mechanism, each track extending in a direction parallel with the scanning direction, a distance between the one of the plurality of tracks and a first end of the scanning chassis being different than a distance between another of the plurality of tracks and the first end of the scanning chassis, each track of the plurality of tracks being coupled by a connecting track; and
shifting a path of movement of the sliding mechanism between one track of the plurality of tracks and another track of the plurality of tracks.

13. A system, comprising:
an optical-scanner scanning chassis comprising a scan line, a first end and a second end, the scanning chassis moving in a scanning direction inside of a non-rotating scanner that houses the scanning chassis;
means for rotating the scanning chassis inside of the scanner to create an acute angle between the scan line and the scanning direction by moving the first end of the scanning chassis more slowly than the second end of the scanning chassis while moving the scanning chassis across the scanner; and
means for moving the scanning chassis in the scanning direction along the inside of the scanner and with the acute angle between the scan line and the scanning direction.

14. The system according to claim 13, wherein the first end of the scanning chassis is fixed, and
wherein the means for rotating further moving the second end of the scanning chassis is moved until the scanning chassis is rotated to create the acute angle between the scan line and the scanning direction.

15. The system according to claim 13, wherein the means for rotating further moving the first end of the scanning chassis in a first direction and moving the second end of the scanning chassis in a second direction opposite to the first direction until the scanning chassis is made to create the acute angle between the scan line and the scanning direction.

16. The system according to claim 13, wherein optical-scanner scanning chassis is rotated with a motor.

17. A system, comprising:
an optical-scanner scanning chassis mounted inside of a scanner and comprising a scan line, a first end and a second end, the scanning chassis moving in a scanning direction inside of the scanner;
a driving module pivotally coupled to the first end of the scanning chassis and capable of driving the first end of the scanning chassis in the scanning direction; and
a leading module pivotally coupled to the second end of the scanning chassis and capable of guiding the second end of the scanning chassis in the scanning direction, wherein the scanning chassis being rotated with respect to the scanner to create an acute angle between the scan line and the scanning direction.

18. A system, comprising:
an optical-scanner scanning chassis comprising a scan line, a first end and a second end, the scanning chassis moving in a scanning direction;
a driving module pivotally coupled to the first end of the scanning chassis and capable of driving the first end of the scanning chassis in the scanning direction; and
a leading module pivotally coupled to the second end of the scanning chassis and capable of guiding the second end of the scanning chassis in the scanning direction.
wherein the scanning chassis being rotated to create an acute angle between the scan line and the scanning direction, and
wherein the driving module further comprises a chassis-positioned mechanism, the chassis-positioned mechanism comprising a shaft and a bushing, the bushing receiving the shaft, and
wherein the first end of the scanning chassis is pivotally coupled on the bushing.

19. The system according to claim 18, wherein the shaft extends in a direction that is parallel to the scanning direction.

20. The structure according to claim 18, wherein the driving module further comprises a chassis-driven module,
wherein the bushing capable of being driven by the chassis-driven module such that the first and of the scanning chassis is moved in a direction of extension of the shaft.

21. A system, comprising:
an optical-scanner scanning chassis comprising a scan line, a first end and a second end, the scanning chassis moving in a scanning direction;
a driving module pivotally coupled to the first end of the scanning chassis and capable of driving the first end of the scanning chassis in the scanning direction; and
a leading module pivotally coupled to the second end of the scanning chassis and capable of guiding the second end of the scanning chassis in the scanning direction,
wherein the scanning chassis being rotated to create an acute angle between the scan line and the scanning direction, and
wherein the leading module comprises:
a first track extending in a direction parallel with the scanning direction;
at least one second track extending in a direction parallel with the scanning direction, a distance between the first track and the first end of the scanning chassis being longer than a shortest distance between the second track and the first end of the scanning chassis;
a connecting track capable of connecting the first track and the second track;
a sliding mechanism capable of moving along the first track, the second track or the connecting track, the second end of the scanning chassis coupled to the sliding mechanism, whereby the second end of the scanning chassis can be moved along the first track, the second track or the connecting track; and
at least one switch shifting the path of movement of the sliding mechanism.

22. The system according to claim 17, wherein the optical-scanner scanning chassis is automatically rotated with a motor.

23. A method for scanning, the method comprising:
moving a first end of a scanning chassis of an optical scanner more slowly than a second end of the scanning chassis as the scanning chassis is moved in a scanning direction inside of the optical scanner so that the scanning chassis is rotated with respect to the scanner to create an acute angle between a scanning line of the optical scanner and the scanning direction along the inside of the optical scanner, the scanning chassis comprising the first end and the second end; and,
moving the first end and the second end of the scanning chassis in the scanning direction and with the acute angle between the scan line and the scanning direction.

24. The method according to claim 23, wherein moving the first end of the scanning chassis more slowly than the second end comprises pivotally coupling one end of the scanning chassis to a driving module, and pivotally coupling the other end of the scanning chassis to a leading module, and
wherein moving the first end and the second end of the scanning chassis in the scanning direction comprises driving the one end of the scanning chassis by the driving module in the scanning direction, and guiding the other end of the scanning chassis by the leading module in the scanning direction.

25. The method according to claim 24, wherein the second end of the scanning chassis is coupled to the sliding mechanism, and,
the method further comprising:
moving a sliding mechanism along of one of a first track and second track, the first and second track extending in a direction parallel with the scanning direction; and,
shifting a path of movement of the sliding mechanism between the first track and the second track.

26. A method for scanning, the method comprising:
moving a first end of a scanning chassis of an optical scanner more slowly than a second end of the scanning chassis so that the scanning chassis is rotated to create an acute angle between a scanning line of the optical scanner and a scanning direction of the optical scanner, the scanning chassis comprising the first end and the second end, wherein moving the first end of the scanning chassis more slowly than the second end comprises pivotally coupling one end of the scanning chassis to a driving module, and pivotally coupling the other end of the scanning chassis to a leading module; and
moving the first end and the second end of the scanning chassis in the scanning direction and with the acute angle between the scan line and the scanning direction, wherein moving the first end and the second end of the scanning chassis in the scanning direction comprises driving the one end of the scanning chassis by the driving module in the scanning direction, and guiding the other end of the scanning chassis by the leading module in the scanning direction;
moving a sliding mechanism along one of a plurality of tracks, the second end of the scanning chassis being coupled to the sliding mechanism, each track extending in a direction parallel with the scanning direction, a distance between the one of the plurality of tracks and the first end of the scanning chassis being different than a distance between another of the plurality of tracks and the first end of the scanning chassis, each track of the plurality of tracks being coupled by a connecting track; and
shifting a path of movement of the sliding mechanism between one track of the plurality of tracks and another track of the plurality of tracks.

27. A method for scanning, the method comprising:
moving a first end of a scanning chassis of an optical scanner more slowly than a second end of the scanning chassis so that the scanning chassis is rotated to create an acute angle between a scanning line of the optical scanner and a scanning direction of the optical scanner, the scanning chassis comprising the first end and the second end;

moving the first end and the second end of the scanning chassis in the scanning direction and with the acute angle between the scan line and the scanning direction;

moving a sliding mechanism along one of a plurality of tracks, the one end of the scanning chassis being coupled to the sliding mechanism, each track extending in a direction parallel with the scanning direction, a distance between the one of the plurality of tracks and a first end of the scanning chassis being different than a distance between another of the plurality of tracks and the first end of the scanning chassis, each track of the plurality of tracks being coupled by a connecting track; and shifting a path of movement of the sliding mechanism between one track of the plurality of tracks and another track of the plurality of tracks.

* * * * *

UNITED STATES PATENT AND TRADEMARK OFFICE
CERTIFICATE OF CORRECTION

| | |
|---|---|
| PATENT NO. | : 7,362,480 B2 |
| APPLICATION NO. | : 10/063446 |
| DATED | : April 22, 2008 |
| INVENTOR(S) | : Chin-Chung Lien et al. |

Page 1 of 1

It is certified that error appears in the above-identified patent and that said Letters Patent is hereby corrected as shown below:

Column 6, line 24 (Claim 2):   Delete "scanner" and insert -- scanner, --, therefor;

Column 6, line 56 (Claim 6):   Delete "monnted" and insert -- mounted --, therefor;

Column 7, line 18 (Claim 7):   Delete "paths" and insert -- paths, --, therefor;

Column 9, line 12 (Claim 18):   Delete "direction." and insert -- direction, --, therefor;

Column 9, line 27 (Claim 20):   Delete "and" and insert -- end --, therefor; and Column 10, lines 21-22 (Claim 25):   Delete "mechanism," and insert -- mechanism; --, therefor.

Signed and Sealed this
Fourth Day of January, 2011

David J. Kappos
*Director of the United States Patent and Trademark Office*